US010146301B1

(12) United States Patent
Jassal et al.

(10) Patent No.: US 10,146,301 B1
(45) Date of Patent: Dec. 4, 2018

(54) RENDERING RICH MEDIA CONTENT BASED ON HEAD POSITION INFORMATION

(71) Applicant: Amazon Technologies, Inc., Reno, NV (US)

(72) Inventors: Reginald Jassal, Edinburgh (GB); Graeme Smith, Dalkeith (GB)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 14/670,010

(22) Filed: Mar. 26, 2015

(51) Int. Cl.
  *G06F 3/01* (2006.01)
  *G06Q 30/02* (2012.01)
  *H04N 13/02* (2006.01)

(52) U.S. Cl.
  CPC .............. *G06F 3/012* (2013.01); *G06F 3/017* (2013.01); *G06Q 30/0261* (2013.01); *H04N 13/0239* (2013.01)

(58) Field of Classification Search
  CPC ............ G06F 3/012; G09G 2320/0261; G09G 2340/045; G09G 2340/14
  See application file for complete search history.

(56) References Cited

U.S. PATENT DOCUMENTS

| | | | | |
|---|---|---|---|---|
| 5,848,399 A | * | 12/1998 | Burke .................. | G06Q 10/087 235/383 |
| 9,342,143 B1 | * | 5/2016 | Rhodes .................... | G06F 3/011 |
| 2006/0205430 A1 | * | 9/2006 | Park ........................ | H04W 4/10 455/518 |
| 2010/0125816 A1 | * | 5/2010 | Bezos ................... | G06F 1/1626 715/863 |
| 2012/0054690 A1 | * | 3/2012 | Lim ........................ | G06F 3/012 715/852 |
| 2012/0262448 A1 | * | 10/2012 | Kim ........................ | G06F 3/011 345/419 |
| 2013/0005443 A1 | * | 1/2013 | Kosta ................... | G07F 17/3206 463/25 |
| 2014/0049563 A1 | * | 2/2014 | Tobin ....................... | G06F 3/012 345/649 |
| 2014/0323192 A1 | * | 10/2014 | Keilwert ............. | G07F 17/3227 463/16 |
| 2015/0015671 A1 | * | 1/2015 | Kellerman .............. | G06F 3/012 348/46 |
| 2015/0293588 A1 | * | 10/2015 | Strupczewski ....... | G06T 7/0042 382/117 |
| 2016/0098780 A1 | * | 4/2016 | Jeong ....................... | G06T 19/20 705/26.8 |

* cited by examiner

*Primary Examiner* — Chun-Nan Lin
(74) *Attorney, Agent, or Firm* — Hogan Lovells US LLP

(57) ABSTRACT

Rich media content, such as advertising, can be provided for display on a two-dimensional screen to give the user an impression that the screen is a window into a three-dimensional (3D) environment. For example, the user's head can be tracked and the graphical elements of the advertisement can be rendered based on the position of the user's head relative to a computing device such that the graphical elements appear to have 3D depth. A full or substantially full 3D view of a product can be presented. Additional information, such as a product description, features, pricing, user ratings, user reviews, among others, can also be displayed based on the position of the user's head relative to the computing device. A 3D video can also be presented, and a user can view different perspectives of the video based on the position of the user's head with respect to the computing device.

20 Claims, 10 Drawing Sheets

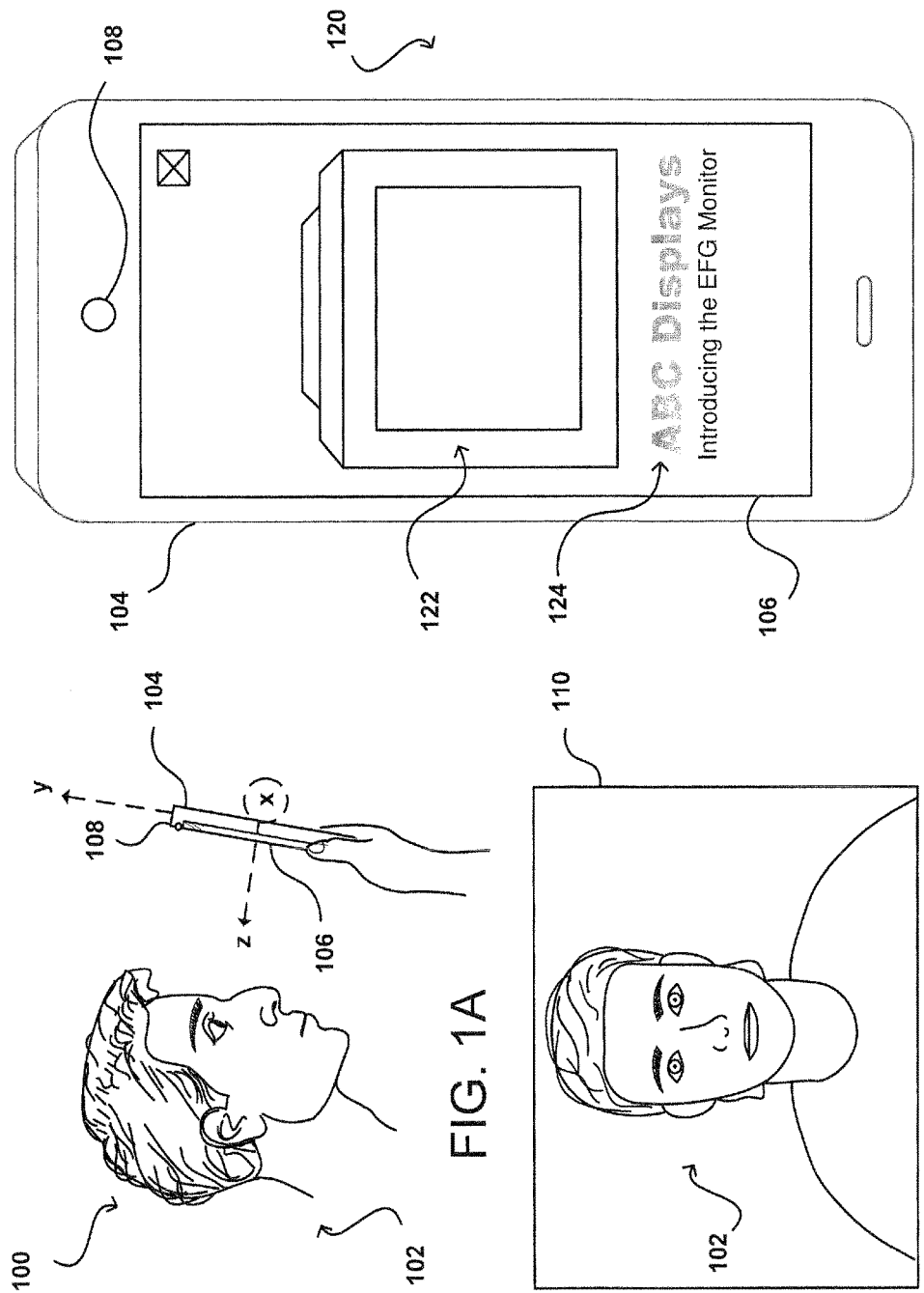

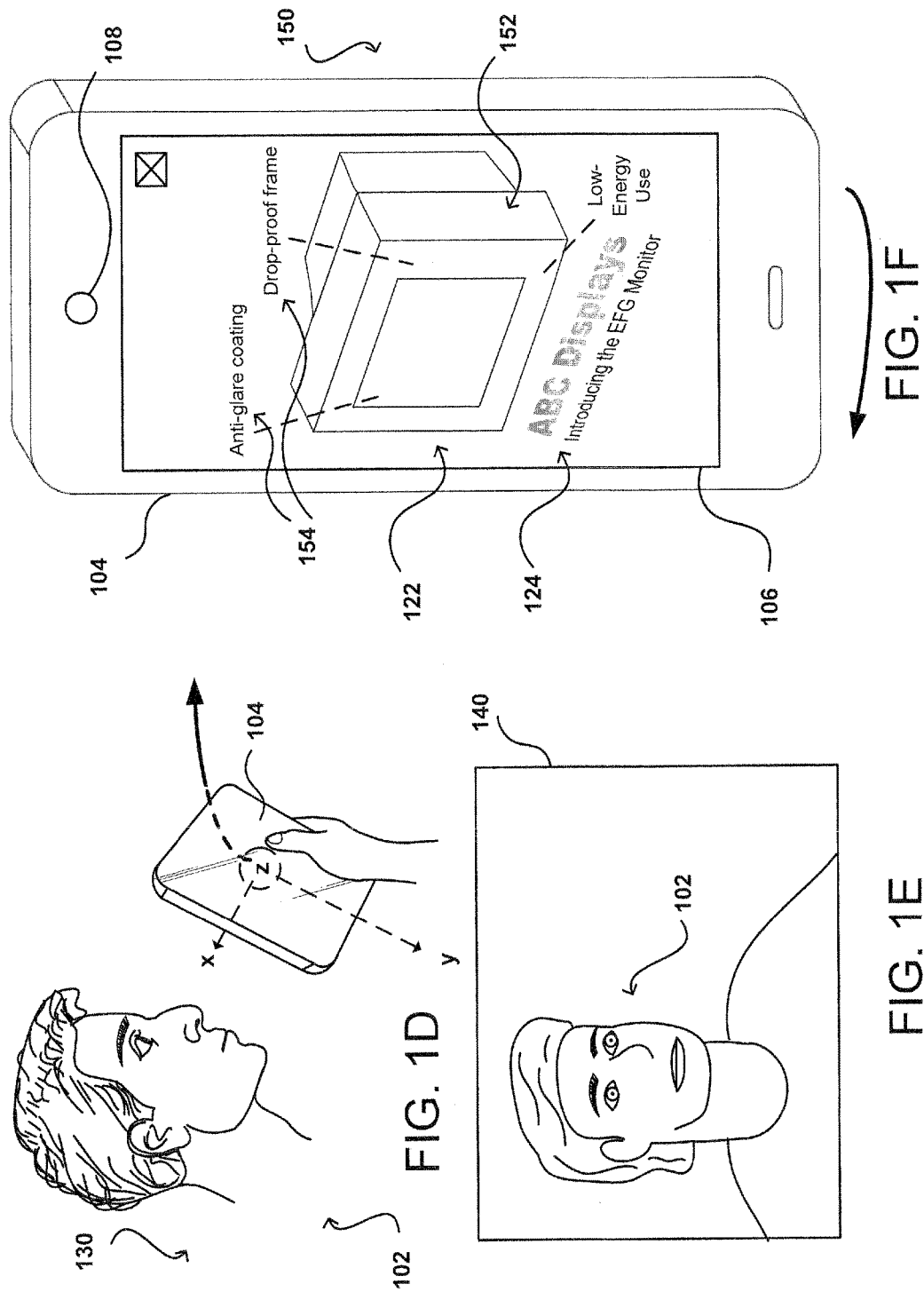

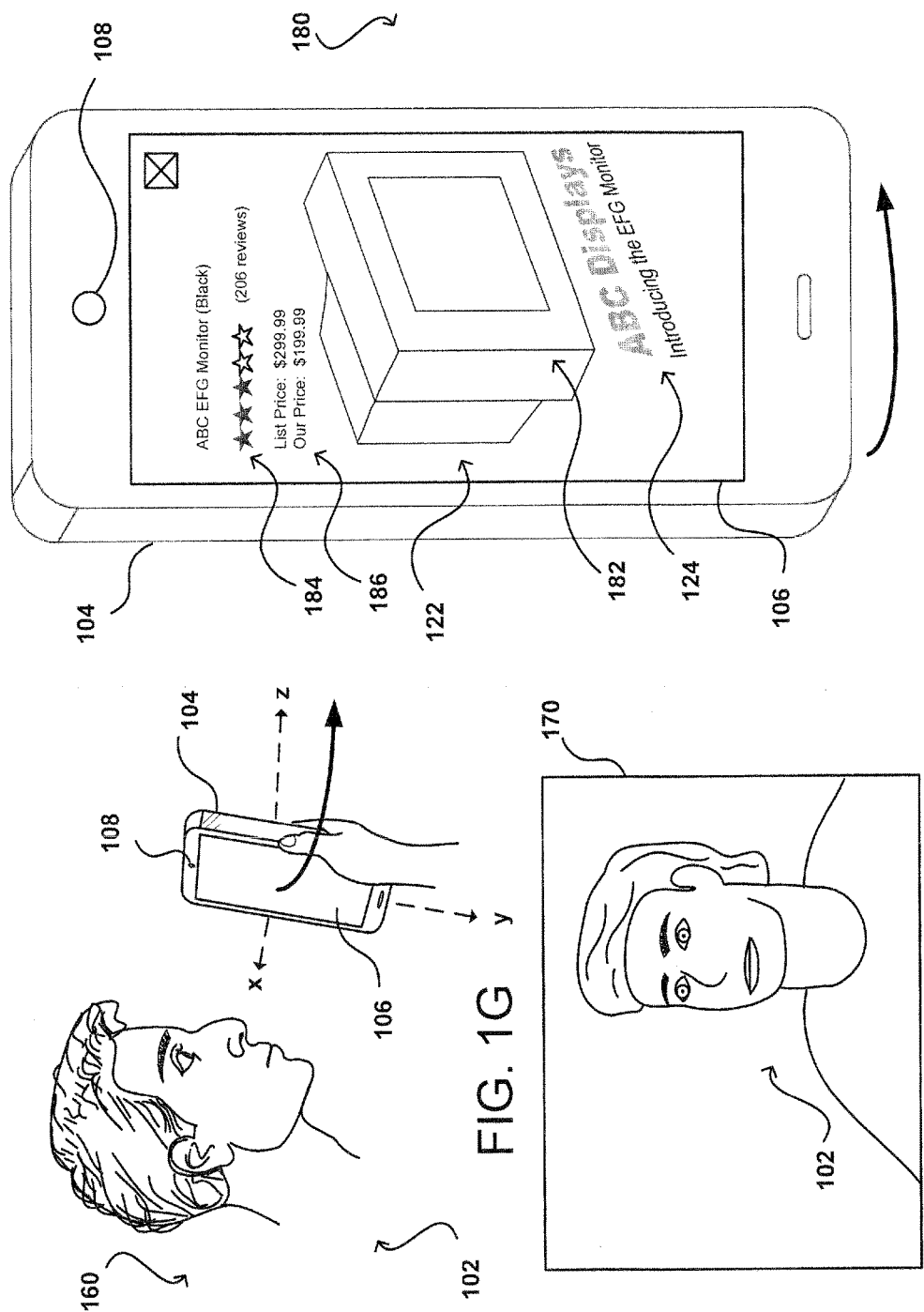

RENDERING RICH MEDIA CONTENT BASED ON HEAD POSITION INFORMATION

BACKGROUND

Mobile electronic devices, such as smart phones, tablet computers, and wearable computing devices (e.g., watches, glasses, among others) are becoming more and more ubiquitous. Users are increasingly reliant on their mobile devices to obtain the information they need to go about their everyday lives. As users spend a greater amount of their time on these devices, and less time using conventional devices, such as televisions and radios, and conventional types of media, such as newspapers and magazines, mobile electronic devices are becoming an important medium for conveying information to users. In particular, it can be especially advantageous to provide rich media content, such as advertising, via mobile electronic devices. Presentation of conventional mobile advertisements, however, has not significantly improved upon television, radio, and other traditional forms of advertising. Conventional mobile advertisements, for instance, may only deliver a passive user experience because there is little interaction provided for between the user and conventional mobile advertisements. Thus, conventional mobile advertisements are often ignored or otherwise quickly bypassed by users.

BRIEF DESCRIPTION OF THE DRAWINGS

Various embodiments in accordance with the present disclosure will be described with reference to the drawings, in which:

FIGS. 1A, 1B, 1C, 1D, 1E, 1F, 1G, 1H, and 1I illustrate an example approach for rendering rich media content based on head position information in accordance with an embodiment;

DETAILED DESCRIPTION

Figure 2:
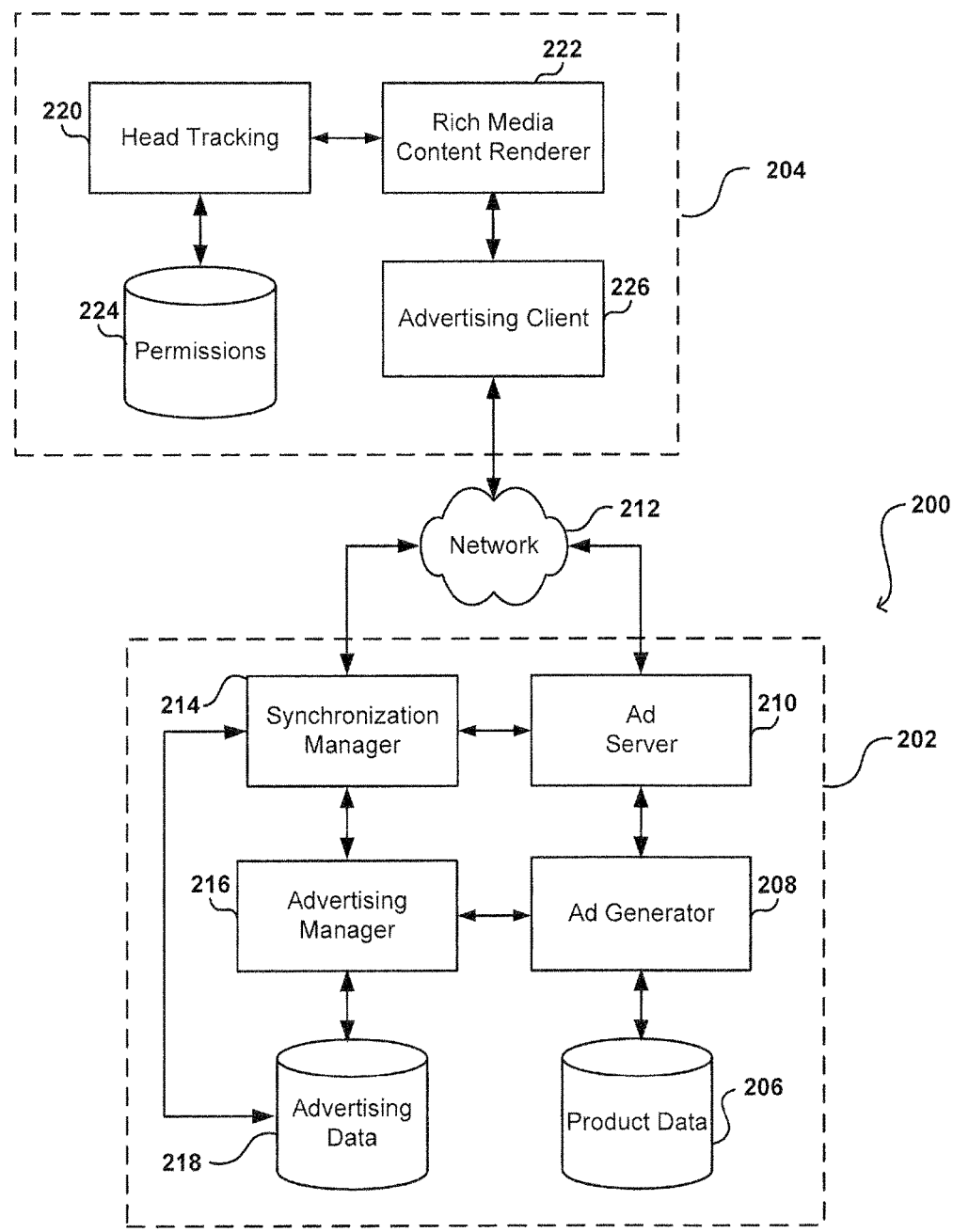
FIG. 2 illustrates an example system for rendering rich media content based on head position information that can be used in accordance with an embodiment.

Systems and methods in accordance with various embodiments of the present disclosure may overcome one or more of the aforementioned and other deficiencies experienced in conventional approaches for providing rich media content, such as advertising, via mobile electronic devices. In particular, various approaches provide a greater degree of interactivity between users and their mobile electronic devices (e.g., smart phones, tablets, wearable computing devices, among others) and enable users to view rendered rich media content on such devices. For example, a computing device can be configured to display, on a two-dimensional (2D) display element, an advertisement incorporating 3D computer graphics that are rendered based on a user's viewing angle relative to the device. As used herein, "3D" refers to depth and other effects (e.g., shadow, parallax, among others) that are applied to objects so that the objects appear to be three-dimensional and/or appear to be placed at different depths when displayed within the 2D display element. When the user moves his head with respect to the device (and/or the device relative to the user's head), different perspectives of the objects are rendered such that the 2D display element appears to be a window into a 3D world. Such an approach can provide a more immersive user experience, and users may be more likely to view rich media content presented in this manner, and view such content for a longer period of time.

In some embodiments, a user can interact with the 3D graphical elements in various ways. In certain embodiments, face or head tracking, tracking of a portion of a user's head (e.g., eyes, nose, mouth, etc.), and/or tracking of the movement of the device (e.g., acceleration, angular rotation, etc.) can be used to render different perspectives of the 3D graphical elements to simulate 3D depth of those elements. In some embodiments, users can move their heads (and/or their devices) to view an object incorporated in an advertisement at different perspectives and obtain a complete or substantially complete 3D view of the object. Such a manner of presentation can be more intuitive than the conventional approach of clicking on and/or viewing multiple, separate images of a single object. In some embodiments, tilting the user's head (and/or the device) in a particular direction can cause additional information about an object (e.g., pricing, product, user ratings, user reviews, etc.) to be displayed. In some embodiments, an advertisement can be served to a computing device as a 3D rendered video that enables users to view the video at different perspectives. In some embodiments, movement of the user's head (and/or device) can be tracked to provide additional interactivity, such as detecting a user's answer to a question (e.g., nodding of the user's head or shaking of the user's head) or navigating from content to content by tilting their head (and/or the device) left or right, up or down, etc.

Various other functions and advantages are described and suggested below as may be provided in accordance with the various embodiments.

FIGS. 1A-1I illustrate an example approach for rendering rich media content based on head position information that can be used in accordance with an embodiment. In the example situation 100 of FIG. 1A, a user 102 can be seen viewing a touchscreen 106 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 108 located on the front of the device and the on same surface as the touchscreen to capture image data of subject matter facing the front of the device, such as the user 102 viewing the touchscreen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may include more than one camera on the front of the device and/or one or more cameras on the back (and/or sides) of the device capable of capturing image data facing the back surface (and/or top, bottom, or side surface) of the computing device. In this example, the camera 108 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, or imaging sensors.

As illustrated in FIG. 1B, when the user 102 positions the computing device in front of himself and gazes directly towards the touchscreen such that the x-y plane of the device is orthogonal or substantially orthogonal to the user's line of sight (where the lateral axis corresponds to the x-axis, the longitudinal axis corresponds to the y-axis, and the depth of the device corresponds to the z-axis), the image data captured by the front-facing camera of the device can include the image 110. Although one image is shown to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position of the user relative to the device and/or the viewing angle of the user with respect to the device. In this example, the device is capable of rendering one or more graphical elements for display on the two-dimensional touchscreen according to a viewing angle of the user with respect to the touchscreen. The device can rely on the position of the head or face of the user (or a portion of the user's head or face) with respect to the device and/or the apparent motion of the user's head or face (or a portion of the user's head or face) with respect to the device to draw or render one or more graphical elements on the touchscreen so as to simulate three-dimensionality.

FIG. 1C illustrates an example 120 of a 3D rendered mobile advertisement presented on the touchscreen 106 based on the user's viewing angle with respect to the device. In this example, the 3D rendered mobile advertisement, comprising an advertised product, display element 122, and advertising text 124, is presented on the touchscreen 106 based on the perspective of the user 102 viewing the device while the device is orthogonal or substantially orthogonal to the user. The 3D rendered mobile advertisement in this situation is a full screen advertisement. In some embodiments, a full-screen 3D rendered mobile advertisement can be served to a computing device based on user selection of a banner advertisement (i.e., an advertisement that is displayed on a portion of a display element of a computing device) that is presented in a mobile application, such as a home screen application, a web browser, an email client, a Short Message Service ("SMS") or other text messaging or chat application, a social networking application, a third party developer mobile application, among others. Although a full-screen advertisement is shown in this example, it will be appreciated that a 3D rendered mobile advertisement is not limited to a full-screen advertisement. In various embodiments, a banner advertisement itself can be a 3D rendered mobile advertisement. As will be appreciated by one of ordinary skill in the art, a product to be advertised can be a tangible item, a virtual item, a service, or a combination thereof.

In some embodiments, a full-screen 3D rendered mobile advertisement can be an interstitial advertisement (i.e., an advertisement that is displayed at certain transition points of a mobile application, such as between different views of the application or in between game levels). In some embodiments, a full-screen 3D rendered mobile advertisement can be incorporated into a lock screen, sleep mode, or screen saver application, and the like. Various other approaches for presenting advertisements on a computing device known to those of ordinary skill in the art can also be enhanced by configuring the advertisements to be rendered based on head position information using the techniques discussed herein.

In FIG. 1D, an example situation 130 illustrates that the user 102 has tilted the computing device 104 to the left with respect to the user, i.e., the user has rotated the device to his left along the longitudinal or y-axis. As seen in FIG. 1E, the tilt or rotation of the device causes the camera to capture a different view or perspective of the user within image 140, here, a three-quarters profile of the head or face of the user facing rightward. The position of the user's face may also be shifted towards a left region of the image 140 because of the leftward tilt or rotation of the device. In this example, the apparent motion of the face or head of the user (which may be primarily due to the motion of the device) can be tracked from the initial position detected in FIG. 1B to the new position depicted in FIG. 1E. Based on the apparent movement of the user's head or face, the 3D rendered mobile advertisement can be redrawn or rendered for display to correspond to the new viewing angle of the user 102. For example, as illustrated in the example 150 of FIG. 1F, when the user tilts the device leftward, the device will apply transformations (e.g., translations, rotations, or scales), animations, lighting effects, shade effects, reflection effects, among other 3D rendering techniques, to advertised display element 122 and advertising text 124 based on the new viewing angle of the user. In particular, the apparent leftward tilt of the face or head of the user causes a right face 152 of the advertised display element 122 to be rendered and displayed. Further, the advertising text 124 is skewed to correspond to the new perspective of the advertised display element 122. Although the advertising text 124 is two-dimensional in this example, it will be appreciated that other embodiments may use 3D rendered text such that different faces of the text can be rendered and displayed based on the user's viewing angle with respect to the device. In this example, the leftward tilt or rotation of the device relative to the user also causes product features 154 to be displayed. In this manner, an advertiser can provide additional information about the advertiser's product without initially inundating the user with too much information.

FIG. 1G illustrates an example situation 160 wherein the user 102 has tilted the computing device 102 to the right with respect to the user, i.e., the user has rotated the device to his right along the longitudinal or y-axis. As seen in the image 170 of FIG. 1H, the tilt or rotation of the device causes the camera 108 to capture a three-quarters profile of the head or face of the user facing leftward, and the position of the user's face has also shifted towards a right region of the image 170. In this example, the apparent movement of the face or head of the user (which, again, may be primarily due to the movement of the device) can be tracked from the previous position depicted in FIG. 1E to the new position depicted in FIG. 1H. The advertised display element 122 and advertising text 124 can be redrawn or rendered for display based on the apparent motion of the user's head or face as seen in FIG. 1I. For example, the user may be positioned as depicted in FIG. 1D and may subsequently tilt the device laterally towards his right until the user's viewing angle is orthogonal or substantially orthogonal with respect to the device as depicted in FIG. 1A (e.g., the user's initial position). The elements of the 3D rendered mobile advertisement may be rendered from what is seen in FIG. 1F to what is seen in FIG. 1C. In particular, the graphical elements of the advertisement may be rendered for display according to their original perspective. It will be appreciated that in various embodiments, interim relative user positions between what is seen in FIG. 1D and what is seen in FIG. 1A can be detected by the device. Interim 3D effects can be applied to the graphical elements of the advertisement such that there may be a smooth animation for the transformation of the elements as seen in FIG. 1F to the elements as seen in FIG. 1C.

As the user continues rotating the device towards his right, the graphical elements of the advertisements may transform and/or be rendered from the advertisement as depicted in FIG. 1C to the advertisement as depicted in the example 180 of FIG. 1I. In particular, the graphical elements may be rendered in accordance with the new viewing angle of the user as seen in FIG. 1G. In this example, the new viewing angle of the user exposes a right face 182 of the advertised display element 122. Further, user ratings 184 and pricing information 186 are also presented to the user. It will be appreciated that the head or face of the user and the device can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. The approach illustrated in FIGS. 1A-1I, sometimes referred to as "dynamic perspective," may give a user an impression that he is interacting with virtual objects having 3D depth.

In addition, or alternatively, a computing device can include one or more motion and/or orientation determination components, such as an accelerometer, gyroscope, magnetometer, or a combination thereof, that can be used to determine the position and/or orientation of the device. In some embodiments, the device can be configured to monitor for a change in position and/or orientation of the device using the motion and/or orientation determination components. Upon detecting a change in position and/orientation of the device exceeding a specified threshold(s), the graphical elements of an advertisement presented on the device can be redrawn or rendered to correspond to the new position and/or orientation of the device to simulate 3D depth for the graphical elements. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone.

Although FIGS. 1A-1I illustrate an example of 3D rendered graphical elements, other embodiments may utilize other rendering techniques (or no rendering techniques). For example, other embodiments may utilize 2D animation that is rendered based on head position information. In certain embodiments, static 2D or 3D graphics can be rendered based on head position information. That is, movement of the user's head in a particular direction and/or according to a threshold distance can cause a new static image to be presented to the user. In still other embodiments, there may be no rendering of graphics. Instead, head position information is tracked to detect gestures based on head movement.

FIG. 2 illustrates an example configuration of a system 200 for rendering rich media content based on head position information in accordance with an embodiment. The components of the system 200 include an advertising entity 202 that serves advertisements from advertisers (not shown) to a publishing entity 204 that requests for and receives the advertisements from the advertising entity and presents the advertisements to end users. In various embodiments, the advertising entity 202 can be an ad network (e.g., a company that connects advertisers to publishers, such as websites or application developers, that host ads), an ad mediator (e.g., an ad tracking platform that enables the allocation of advertising inventory across multiple ad networks), an ad exchange (e.g., a technology platform that facilitates automated auction-based pricing and buying in real-time between advertiser demand and publisher ad supply), or the like. While the advertising components in this example are shown to be part of the advertising entity's system, it should be understood that these components can be part of a separate system or be provided as a third party service, for example, an external advertising entity. Thus, in one embodiment, advertisement requests may be provided to the advertising entity 202, which would then forward them to an external advertising entity (not shown) and in response receive advertisements associated with the requests.

In this example, the advertising entity 202 generates and serves advertisements that are made available to a viewer of rich media content, and thus can include components such as a product data store 206 that can be used by an ad generator 208 to generate ads that can be served by an ad server 210 (such as a Web server in a Web-based environment) over a network 212 to the viewer's computing device 204. While many of the embodiments are described with respect to a Web-based environment, it should be understood that advertisements are not limited to Web pages, but can be incorporated in any application view or other interface that can be displayed or otherwise conveyed to a viewer.

In the example of FIG. 2, the advertising entity 202 includes an advertising manager 216, which can include any combination of devices and/or processes operable to encompass, monitor, and/or control a number of different algorithms and components for selecting advertisements. In various embodiments, the manager 216 determines whether a client, such as publishing entity 204, is capable of tracking the position of a user's head or face or a portion of the user's head or face and rendering rich media content, such as 3D computer graphics, based on the position. In some embodiments, this determination can be made by the advertising entity based on user agent information sent by a computing device requesting for an advertisements. In other embodiments, the requesting computing device can provide information in the request for the advertisement indicating that the computing device is capable of tracking position information and rendering rich media content based on the position information. In still other embodiments, an application programming interface (API) can be provided for a publishing entity to request for an advertisement including rich media content rendered based on head position information. In an embodiment, advertisements incorporating rich media content based on the position of the user's head or face or a portion of the user's head or face can be delivered to end users as a new Multi-Purpose Internet Mail Extensions (MIME) type or Internet media type, such as model/x3D+dynper, in order for a client to properly render the rich media content, such as 3D computer graphics.

The manager 216 may also include components configured to select landing pages related to advertisements, as well as to dynamically determine categories for each selected landing page. When the advertising manager 216 decides on a landing page, category, and/or other such information, the advertising manager 216 can store the advertising data to an advertising data store 218, which in some embodiments can comprise separate data in the production data store 206. Portions of this data alternatively can be stored and/or accessed from other appropriate storage devices of the system and/or across the network.

The advertising entity 202 also can include a synchronization manager 214 that can periodically synchronize the advertising data stored at the data store 218 with product data 206, such that the appropriate landing pages, creative content, and financial information can be designated and updated as desired.

In this example, publishing entity 204 is part of an application running on a computing device. In other embodiments, a publishing entity can be a website that provides advertisement alongside content to end users. Although the components of the publishing entity 204 in this example are shown to be separate components, each can be a component of the same or separate applications. For instance, in some embodiments, the head tracking component 220 and rich media content rendering component 222 can both be components (software, hardware, or a combination of both) of a first application, and advertising client 226 can be a component of a second application. Head tracking component 220 tracks a position of a user's head or face or a portion of the user's head or face. The rich media content rendering component 222 obtains the position information from the head tracking component 220 and rendering logic (e.g., script or other executable code) as input, and renders rich media content based on the head position information and rendering logic. In an embodiment, the rich media content comprises a 3D model formatted as MIME type model/x3D+dynper. Upon parsing this MIME type, head tracking information can be obtained from head tracking component 220 and a particular perspective of a 3D model will be rendered based on the head position and rendering logic.

In various embodiments, permissions must be obtained from a user to enable an application to utilize head tracking for rendering rich media content. In some embodiments, the application may only be required to obtain permission to use one or more cameras of the computing device. In other embodiments, the application may explicitly require permissions to track the position of the user's head or other characteristics of the user that can be captured by a camera or other imaging element. In some embodiments, permissions must be obtained separately for each advertisement including elements rendered based on head position information. In other embodiments, permissions may only be required once until the user reconfigures the permissions of the application. Permission information is stored in permission data store 224.

Publishing entity 204 can also include an advertising client component 226 that interfaces with an advertising entity, such as advertising entity 202. The advertising client component 226 sends requests for advertisements including elements rendered based on head position information, and receives the advertisements from the advertising entity. An advertisement will include one or more graphical elements to be rendered based on the position of the user's head or face or a portion of the user's head or face and rendering logic for how to render a particular perspective based on head or face position information.

As mentioned, various embodiments involve face or head tracking or tracking of a portion of a user's head or face for rendering rich media content. In at least some embodiments, multiple cameras can be used for tracking the position of the user's head or face (or portion thereof) in 3D. By recovering the third dimension, i.e., depth, distance, and/or disparity, from at least a pair of 2D images, head or face tracking can be less sensitive to factors such as shadows, lighting changes, and camera dynamics. Depth, disparity, or distance information can also optimize head and face tracking. As the relative sizes of a user's facial features are known, the computational expense of searching over scales can be minimized and the probability of false detections may be reduced since the search space is decreased. Depth, distance, or disparity also can be used to obtain shape and size information that can help to differentiate among foreground objects for improved tracking. Further, occlusions can be more easily detected and handled more explicitly. Depth, distance, or disparity can also provide at least a third, disambiguating dimension that can help to improve prediction in tracking.

Figure 3A:
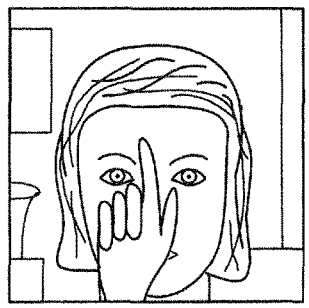
FIGS. 3A, 3B, 3C, 3D, and 3E illustrate an example approach for determining depth, distance, and/or disparity that can be used in accordance with an embodiment.
Figure 3B:

FIGS. 3A-3E illustrate an example approach for determining depth, distance, and/or disparity information from at least two images captured at the same time or substantially the same time in accordance with an embodiment. FIG. 3A illustrates what will be referred to herein as a "left" image 300 and FIG. 3B illustrates what will be referred to herein as a "right" image 320, although other orientations can be used as well in other situations and embodiments. These images are each captured by one of a pair of cameras that are offset from each other along a horizontal axis, such that one camera is offset to the left and one is offset to the right in this orientation. As discussed elsewhere herein, pairs of cameras can be offset in up and down directions, among other such options. Since each image is captured using a camera at a slightly different location, the position of objects in each image will be different. In order for the images to combine to form an accurate three-dimensional image, the cameras used to capture the component images should be sufficiently aligned and/or rectified to represent the correct amount of disparity. When the cameras are aligned, correlating or matching feature points between images captured with a stereoscopic camera pair can be determined based at least in part on an epipolar line between the respective images and determined coordinates for at least one of the feature points.

Figure 3C:
Figure 3D:
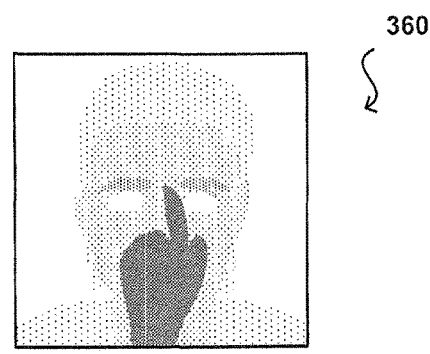

In various embodiments, the pair of front-facing cameras may capture the images simultaneously or substantially simultaneously and therefore would include matching points of interest in their respective images. For example, the user's nose, eyes, eyebrows, lips, or other feature points may be identified by the computing device in both images by using any one of the detection or tracking processes discussed further below. FIG. 3C illustrates an example combination image 340, and FIG. 3D illustrates a stereo disparity image 360 of the combination image 340 showing the relative position of various objects in the captured images 300 and 320. As illustrated, objects closest to the camera (as indicated by darker shading), such as the user's hand, have the greatest amount of disparity, or horizontal offset between images. Objects farther away from the device, such as a painting on the wall, have very small amounts of disparity. Objects between these two areas will have intermediate amounts of disparity based upon the relative distance of those objects from the cameras.

Various approaches can be used to determine a stereo disparity image, such as the example disparity image 360 of FIG. 3D, or a stereo disparity map that associates each pixel (x,y) with a disparity value d, i.e., defining a function of (x, y, d). In general, determining stereo disparity can include one or more of the following: a matching cost computation, cost aggregation, disparity computation or optimization, and disparity refinement. Matching cost computations involve analyzing respective regions of a pair of stereo images to determine a similarity measure such as minimizing the sum of squared differences (SSD) or the sum of absolute differences (SAD), or maximizing the normalized cross correlation (NCC) or cross coefficient (CC). If (x,y) represents a pixel in image I and (x',y') represents a pixel in image T, then these functions can be defined as follows:

$$SSD(x,y) = \Sigma_{x',y'} [T(x',y') - I(x+x',y+y')]^2$$

$$SAD(x,y) = \Sigma_{x',y'} |T(x',y') - I(x+x',y+y')|$$

$$NCC(x,y) = \Sigma_{x',y'} T(x',y') I(x+x',y+y')$$

$$CC(x, y) = \frac{\sum_{x',y'} T'(x', y') I(x + x', y + y')}{\sqrt{\sum_{x',y'} T'(x', y')^2 \sum_{x',y'} I(x + x', y + y')^2}},$$

where T'(x',y') is the average value of T, as defined by:

$$T'(x', y') = T(x', y') - \frac{1}{wh} \sum_{x',y'} T(x', y')$$

and I'(x+x',y+y') is the average value of I in the region coincident with T, as defined by:

$$I'(x + x', y + y') = I(x + x', y + y') - \frac{1}{wh} \sum_{x',y'} T(x', y'),$$

where x'=0 ... w-1 and y'=0 ... h-1 for SSD, SAD, NCC, and CC.

Matching cost computations can also be based on truncated quadratics, contaminated Gaussians, phase responses, filter-bank responses, among others.

Cost aggregation relates to distributing the matching cost computation over a support region, such as by summing or averaging over a respective window or region of a pair of stereo images. A support region can be either two-dimensional at a fixed disparity or three-dimensional in x-y-d space. Two-dimensional cost aggregation techniques can be based on square windows, Gaussian convolutions, multiple shiftable windows, windows with adaptive sizes, and windows based on connected components of constant disparity. Three-dimensional cost aggregation techniques can be based on disparity differences, limited disparity gradients, and Prazdny's coherence principle. In some embodiments, iterative diffusion can also be used for aggregating the matching cost to a pixel's neighbors. Iterative diffusion operates by adding to each pixel's cost the weighted values of its neighboring pixels' costs.

Disparity computation and optimization can be characterized as local or global. Local methods involve selecting the disparity associated with the minimum (or maximum) cost value at each pixel. As such, local methods are sometimes characterized as a "winner-take-all" approach. Global methods can be based on an energy-minimization function, wherein disparity at each pixel is based on minimizing a global energy. Global methods can also depend on smoothness assumptions made by a particular global algorithm. Once a global energy has been determined, a variety of algorithms can be used to find the disparity at each pixel, including techniques based on Markov random fields, simulated annealing, highest confidence first approaches, and mean-field annealing. Global optimization techniques can also be based on max-flow, graph-cuts, dynamic programming methods, cooperative algorithms, among other approaches.

Refinement techniques can also be used for improving computation of the stereo disparity image or mapping by determining disparity at the sub-pixel level. One such method is applying iterative gradient descent and fitting a curve to the matching cost computations at discrete disparity levels. Other refinement approaches can include cross-checking (e.g., comparing left-to-right and right-to-left disparity maps), median filtering to compensate for incorrect matching, distributing neighboring disparity estimates to fill in "holes" caused by occlusion, among other techniques.

Figure 3E:
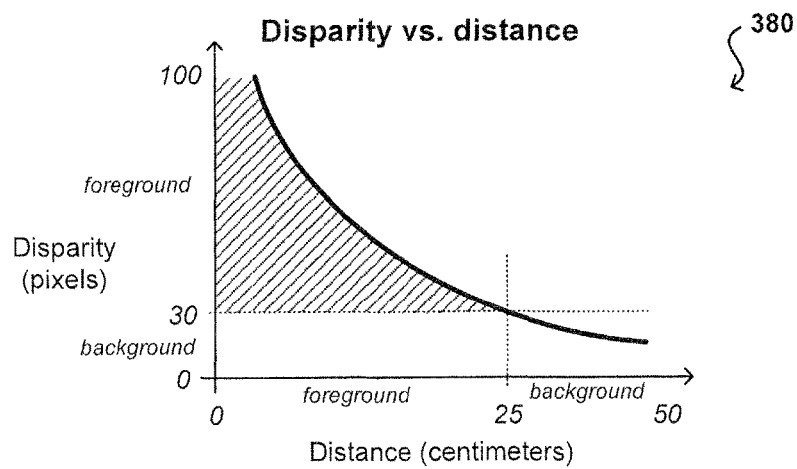

FIG. 3E illustrates an example plot 380 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 380 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = f/B,$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device.

In some embodiments, a head or face detection process is used to detect the user's head or face and determine where a representation of the user's head or face is positioned in one or more images. Approaches for detecting a user's head or face or facial features (e.g., eyebrows, eyes, nose) can be based on feature detection, background subtraction, segmentation, supervised learning, among others. Feature-based detection approaches generally involve extracting features from an image and applying various rules, metrics, or heuristics to determine whether a user's head, face, and/or facial features are present in the image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). In other embodiments, geometric rules can be applied to analyze the spatial relationships among features to verify whether a user is located in an image. Skin color can also be used as a basis for detecting and/or tracking a user because skin color comprises a limited range of the color spectrum that can be relatively efficient to locate in an image.

Extracted features can also be based on higher-level characteristics or features of a user. One example of higher-level feature detection may involve detection of a user feature (e.g., head or face) and then validating existence of the user in an image by detecting more granular components (e.g., eyes, nose, mouth). In this example, a representation of the user can be detected within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented in image. An example set of rules for detecting the user's head or face may dictate that the upper round part of a face comprises a set of pixels of uniform intensity, the center part of a face comprises a set of pixels of a second uniform intensity, and the difference between the intensities of the upper round part and the center part of the face are within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics.

In some embodiments, background subtraction techniques can be used to detect the head or face of a user. Background subtraction involves developing a model of the background in a first image and then determining outlier pixels from the background model in a second image. Significant deviations from the background model may correspond to a representation of the user in the second image. Some background subtraction techniques include modeling background pixels as discrete states (e.g., background, foreground, shadow) and using hidden Markov models (HMM) to identify small blocks of an image that correspond to each state, modeling the background using eigenspace decomposition with the background corresponding to the most descriptive eigenvectors and the foreground corresponding to the difference between the projection of the current image to the eigenspace, or modeling the background using autoregressive moving average (ARMA) processes to filter repetitive motion (e.g., grass blowing in the wind or swaying trees), among other approaches.

In some embodiments, techniques based on segmentation can be used to detect the representation of the head or face of the user in an image. Segmentation-based approaches partition an image into similar regions, and include mean-shift clustering, graph cuts, active contours, among others. The mean-shift approach finds clusters in the spatial and color space. A large number of hypothesized cluster centers are randomly chosen, and each cluster center is moved to the mean lying inside a multidimensional ellipsoid centered on the cluster center, with some of clusters merging during this mean-shift process. The vector corresponding to the old and new cluster centers are called the mean-shift vectors, and the mean-shift vectors are calculated iteratively until the cluster centers do not change position. In graph cut methods, image segmentation is approached as a graph partitioning problem with pixels representing nodes of a graph that are partitioned into disjoint subgraphs by pruning the weighted edges of the graph. The total weight of the pruned edges between two subgraphs is called a cut, and the weights may be based on similarities in color, brightness, and/or texture. In one embodiment, a minimum cut criterion can be used to find partitions that minimize a cut. In another embodiment, a normalized cut can be used that depends on edge weights as well as the ratio of the total connection weights of nodes in each partition to all nodes of the graph.

In active contours approaches, a candidate head or face can be segmented by transforming a closed contour of the head or face boundary such that the contour tightly encloses the head or face region according to an energy function that can be computed locally or globally. Local information is often determined from an image gradient evaluated around the contour while global features are computed inside and outside the object. Global features can include color and texture.

In some embodiments, techniques based on supervised learning can be used to detect the head or face of a user. Supervised learning approaches involve learning different views or perspective of the head or face of the user from a set of examples. Supervised learning methods include principal component analysis (PCA), neural networks, support vector machines (SVM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the autoassociative neural network, the probabilistic decision-based neural network (PDBNN), and the sparse network of winnows (SNoW). Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities (i.e., $$\frac{P(\text{image} \mid \text{object})}{P(\text{image} \mid \text{non-object})} > \frac{P(\text{non-object})}{P(\text{object})}.$$

Inductive learning approaches, such as those based on the C4.5 algorithm or the Find-S algorithm, can also be used to detect the representation of users in an image.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. Viola-Jones scans a sub-window of an input image using features consisting of Haar-like features, black and white boxlets that are weighted during training, and resized over several passes of the detector. A sub-window is determined to be a face candidate if the difference of the sum of pixels within two regions meets a threshold for a Haar-like feature determined during the training stage. Viola-Jones further utilizes the concept of attentional cascading which observes that within an image, most sub-windows are non-face instances. Thus, smaller and more efficient classifiers can be used to reject sub-windows unlikely to be faces at earlier stages while keeping almost all of the positive instances. More complex classifiers are used at later stages to examine face candidates that have not been rejected as face candidates.

Surveys of various approaches of head and face detection are discussed in Yang, Ming-Hsuan et al., "Detecting faces in images: A survey." Pattern Analysis and Machine Intelligence, IEEE Transactions on 24, no. 1 (2002): 34-58 and Hjelmäs, Erik et al. "Face detection: A Survey." Computer Vision and Image Understanding 83, no. 3 (2001): 236-274, which are each incorporated herein by reference.

Figure 4A:
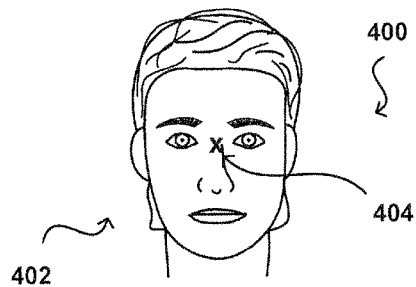
FIGS. 4A, 4B, 4C, 4D, and 4E illustrate certain approaches for tracking an object in accordance with various embodiments.
Figure 4B:
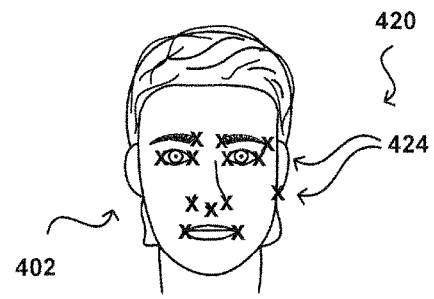

Systems and approaches in accordance with various embodiments track the head or face of a user between a first set of images captured at a first time (simultaneously or substantially at the same time) and a second set of images captured at a second time (simultaneously or substantially at the same time). Various approaches can be used to track the head or face of a user. FIGS. 4A and 4B illustrate example approaches of point tracking that can be used to track the head or face of a user in accordance with various embodiments. In the example 400 of FIG. 4A, a representation of the user 402 is shown with the user's head being represented as a single point 404 between the user's eyes. In some embodiments, the user 402 may be defined or represented as a three-dimensional vector from the point 404 between the user's eyes to a point corresponding to a computing device, such as the point at the center of the front face of the computing device.

The example 420 of FIG. 4B illustrates an example representation of the user 402 wherein salient features of the user are identified and assigned points 424. Feature points can be determined using the Moravec detector, Harris corner detector, the Kanade Shi Tomasi (KLT) detector, the Scale-Invariant Feature Transform (SIFT) detector, or variations thereof. Other feature point detection techniques that can be used include Förstner corner detection, Wang and Brady corner detection, smallest univalue segment assimilating nucleus (SUSAN) corner detection, Trajkovic and Hedley corner detection, features from accelerated segment test (FAST) detection, among others.

Point tracking methods can be deterministic or probabilistic. Deterministic approaches attempt to minimize a cost of associating the user's head or face in a first image to a candidate head or face in a second image. Probabilistic point tracking methods model the uncertainties of sensor data to establish correspondence from image to image. For example, measurements obtained from sensors often include noise and tracking the user's head or face may be susceptible to random motions that aren't necessarily desirable to capture, such as hand tremor or the device being operated in a moving vehicle. Probabilistic point tracking methods typically use the state space approach to model properties such as position, velocity, and acceleration and take into account measurement uncertainties in the modeling. Probabilistic approaches include Kalman filtering, extended Kalman filtering, particle filtering, among others.

Figure 4C:
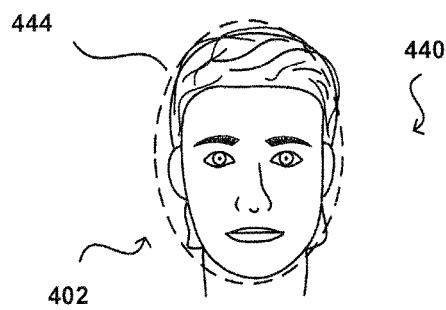

In at least some embodiments, one or more kernel tracking processes can be used to track the head or face of the user. As used herein, "kernel" refers to a primitive shape and/or appearance of the head or face of the user. The example 440 of FIG. 4C illustrates an example kernel-based approach for tracking the head or face of the user 402, wherein the head or face of the user is encompassed by an ellipse 444. A kernel representing the user 402 can include the ellipse 424 and an associated histogram. In other embodiments using a similar approach, other primitive geometric shapes can be used, such as squares, rectangles, circles, among others.

Kernel-based tracking methods determine the motion of the face or head of the user from image to image, and include simple template matching, optical flow analysis, and multi-view appearance modeling. In simple template matching, a brute force approach can be used to search an image for a region similar to a template of the user's head or face defined in a previous image. The position of the template in the current image is determined by a similarity measure, such as a maximum of the cross-correlation or normalized cross-correlation or a minimum of a criterion, such as the mean squared error, mean absolute difference, or the number of threshold differences. Templates can define image intensity, color features, surface radiance, or image gradients of the face or head of the user. A template can also include color histograms or mixture models of the pixels of a primitive geometric bounding the object. In some embodiments, other search methods can be used instead of a brute force search, such as mean-shift tracking (discussed elsewhere herein) or Jepson tracking. In Jepson tracking, the head or face of the user is represented as a three component mixture comprising stable appearance features, transient features, and noise. An online version of the expectation maximization (EM) algorithm is used to determine the parameters of the mixture.

Another kernel-based tracking approach is to compute the translation of a kernel representing the head or face of the user using an optical flow method. Optical flow techniques compute motion from spatial and temporal derivatives of image features such as intensities or filtered versions of the image. Such techniques are based on the assumption that all temporal intensity changes are due to motion only. In some embodiments, local approaches based on the Lucas-Kanade optical flow algorithm can be used to track the head or face of the user. The algorithm is set forth in Lucas, Bruce D. et al. "An iterative image registration technique with an application to stereo vision." In Proceedings of the 7th international joint conference on Artificial intelligence. 1981, and is incorporated herein by reference. The Lucas-Kanade algorithm estimates displacement of a neighborhood of pixels by analyzing changes in pixel intensity from the known intensity gradients of the image in that neighborhood. In other embodiments, a global approach, such as the Horn-Schunk algorithm or a variation thereof, can be used to track the head or face of the user. The Horn-Schunk algorithm is set forth in Horn, Berthold K P et al. "Determining optical flow." Artificial intelligence 17, no. 1 (1981): 185-203, which is incorporated herein by reference.

In template-based matching and optical flow analysis, the kernels are usually generated online and represent the information gathered about the user's head or face from the most recent observations. However, the user's head or face may appear different according to the perspectives of the cameras used to capture the images being analyzed, and if the view of the user's head or face changes significantly during tracking, the kernel may no longer be valid and tracking will fail. Thus, in some embodiments, different perspectives of the user's head or face can be learned offline and used for tracking. Kernel-based tracking based on multiview appearance modeling include PCA and SVM, which are discussed elsewhere herein.

Figure 4D:
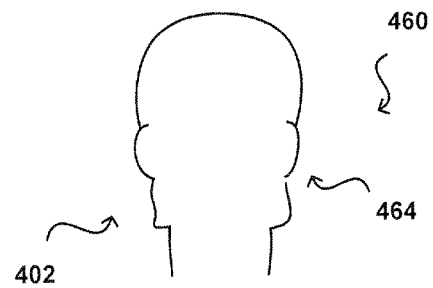
Figure 4E:
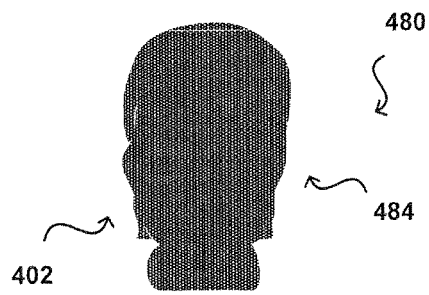

Objects can have complex shapes that sometimes cannot be accurately represented as primitive geometric shapes. In particular, the head or face of the user cannot be circumscribed precisely by simple geometric shapes. Thus, in at least some embodiments, one or more silhouette or contour tracking processes can be used to track the head or face of the user. FIGS. 4D and 4E illustrate example approaches of contour or silhouette-based tracking that can be used to track the face or head of the user in accordance with various embodiments. FIG. 4D illustrates an example 460 of the contours 464 of the head or face of the user 402, defined by the boundaries of the user's head or face. Other contour representations of the user may comprise of points at the boundaries of the user's head or face instead of edges. The region inside the contours is sometimes referred to as the "silhouette," which can also be used to represent the user's head or face for tracking in some embodiments. FIG. 4E illustrates an example 480 of a silhouette 484 of the head or face of the user 402.

In contour-based tracking approaches, an initial contour of the user's head or face is evolved to its new position in a current image. Tracking the user's head or face by evolving a contour of the head or face can be performed using a state model of the contour shape and motion or minimizing the contour energy using direct minimization techniques. In the contour shape and motion modeling approach, the state of the model is updated at each time instant such that the contour's a posteriori probability is maximized. The posterior probability depends on the prior state and the current likelihood which is typically defined in terms of the distance of the contour from observed edges. Kalman filtering or particle filtering can be used to predict new states of the contour and update the states of the contour. In energy-based contour tracking, the energy of the contour can be minimized using greedy methods or by gradient descent. The contour energy can be defined in terms of temporal information in the form of optical flow fields or appearance statistics generated from the user's head or face and the background regions.

In silhouette-based tracking methods, the silhouette is searched for image to image. Such approaches are similar to approaches for template matching in that the search for a silhouette and its associated model in a current image is performed by determining the similarity of the user's head or face with the model generated from the hypothesized silhouette based on a previous image. Silhouette tracking approaches can also be determined based on identifying the flow fields for each pixel inside the silhouette that is dominant over the entire silhouette.

Figures 5A, 5B, 5C:
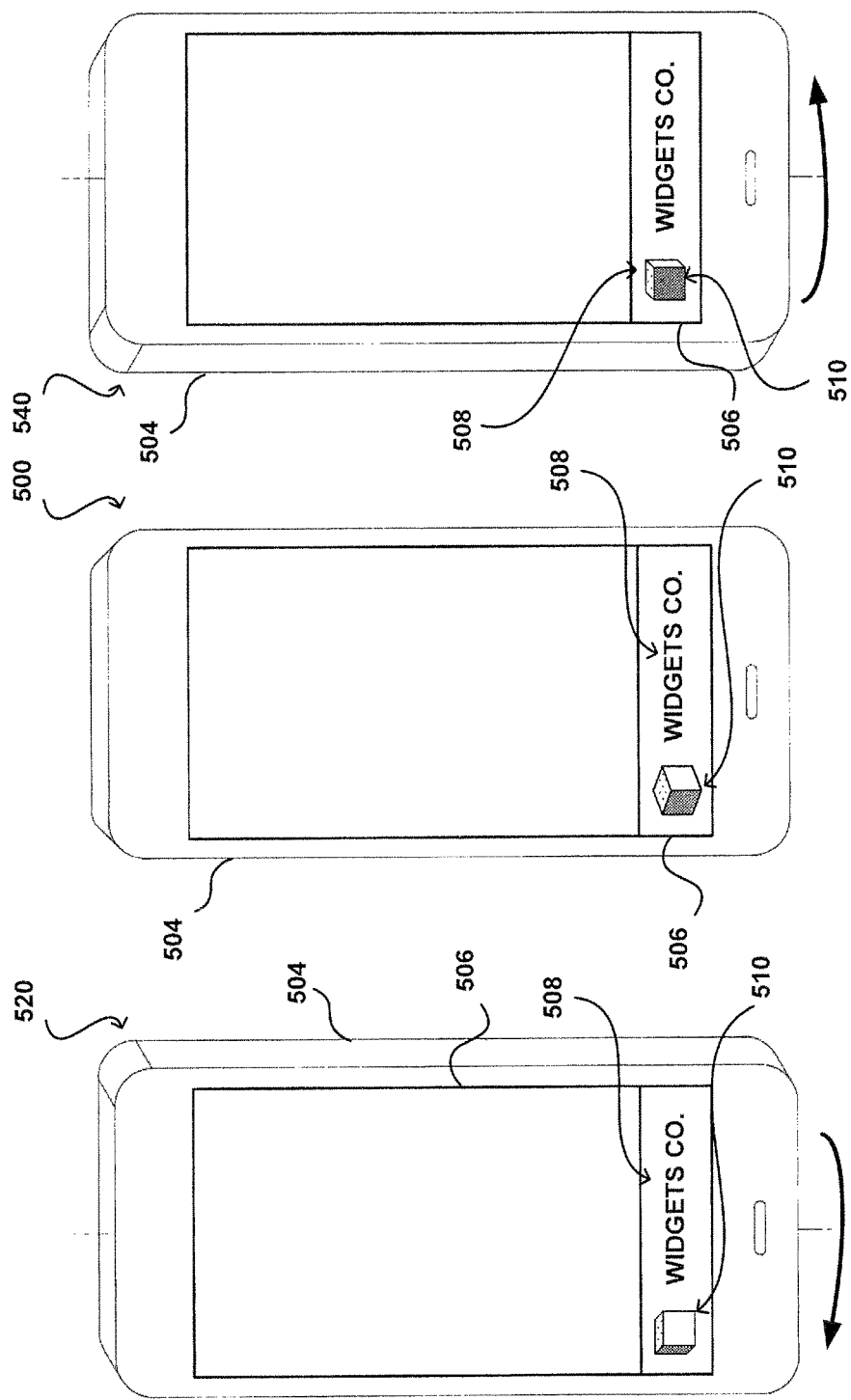
FIGS. 5A, 5B, and 5C illustrate an example approach for rendering rich media content based on head position information in accordance with an embodiment.

FIGS. 5A-5C illustrate an example approach for rendering rich media content based on head position information that can be used in accordance with an embodiment. FIG. 5B illustrates an example 500 of a banner advertisement 508 including a 3D box 510 with a top surface, a left front-facing surface, and a right front-facing surface that has been drawn or rendered based on the current position or viewing angle of a user (not shown) with respect to the device. In this example, the left and right front-facing surfaces appear to be equal in scale when the line of sight of a user is orthogonal or substantially orthogonal to the display screen 506 of the computing device 504, such as depicted in FIG. 1A.

In the example 520 of FIG. 5A, the user has rotated the device towards his left (and/or rotated his head to his left), such as depicted in FIG. 1D. The 3D box 510 may be animated or rendered such that the right front-facing surface of the 3D box appears more prominently on the display screen 506 and the left front-facing surface appears at a more oblique angle. In the example 540 of FIG. 5C, the user has rotated the device to the right (and/or rotated his head to the right), such as depicted in FIG. 1G. The computing device 504 will render and/or animate the 3D box 510 such that the left front-facing surface of the 3D box appears more prominently on the display screen 506 and the right front-facing surface appears at a more oblique angle.

In this example, the text remains static when the user rotates the device to the left or to the right (and/or moves his head to the left or to the right). Thus, advertisements including elements rendered based on head position information can include some elements that are not redrawn or rendered based on the position of the user's head or face or a portion of the user's head or face. As will be appreciated, advertisements can include some 2D elements as well as some 3D elements. Although banner advertisement 508 is shown to be spanning a bottom portion of the display element 506, it will be appreciated that banner advertisements can also be displayed at the top or sides of a display element as well. Further, a banner advertisement need not span the entirety of the length or width of the device but can be embedded within a portion of the display element.

Figure 6:
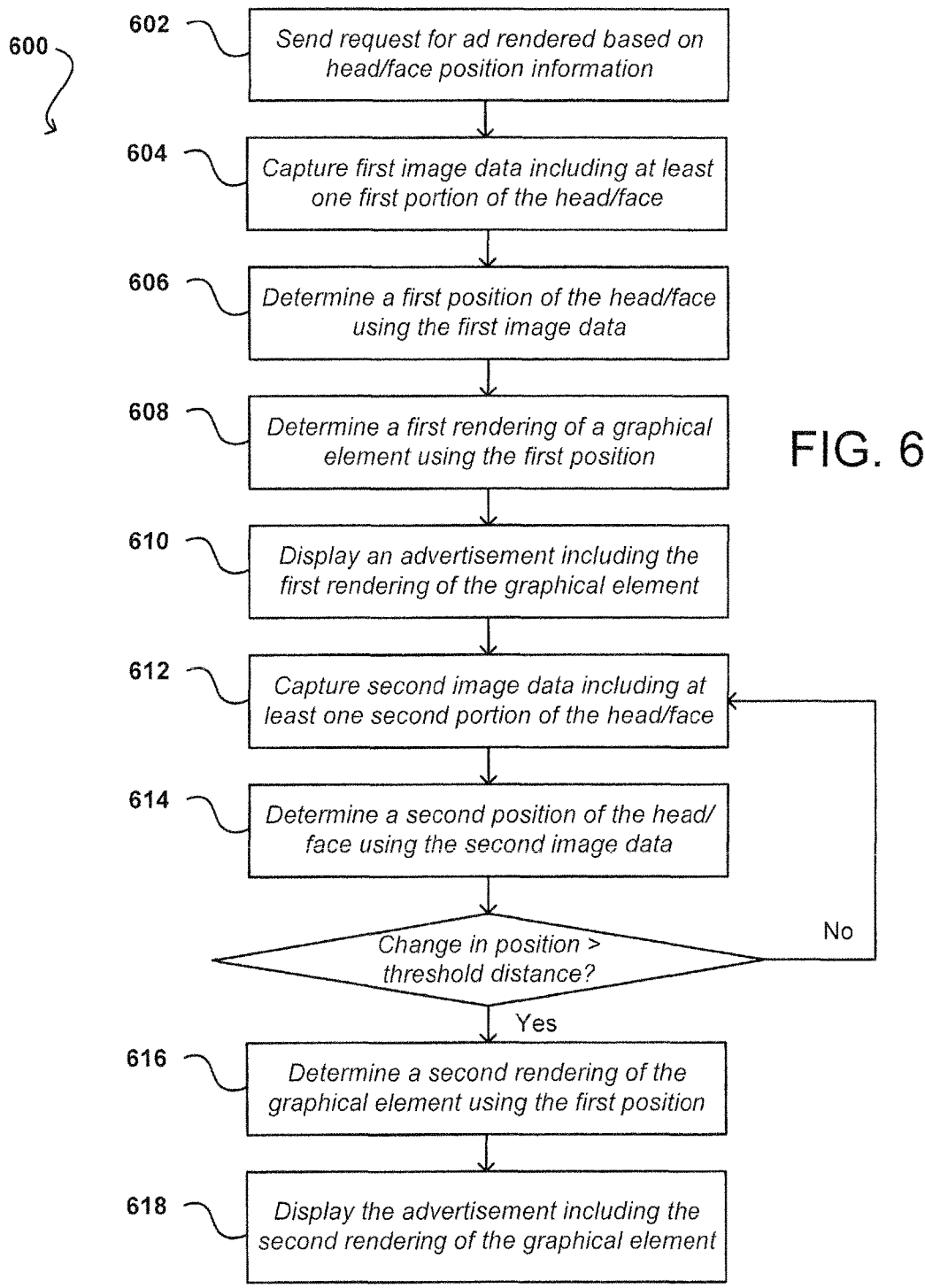
FIG. 6 illustrates an example process for rendering rich media content based on head position information that can be used in accordance with an embodiment.

FIG. 6 illustrates an example process 600 for rendering rich media content based on head position information in accordance with an embodiment. It should be understood that, for any process discussed herein, there can be additional, fewer, or alternative steps performed in similar or alternative orders, or in parallel, within the scope of the various embodiments unless otherwise stated. The process may begin by powering on a computing device and accessing an application incorporating an advertisement including one or more elements rendered based on head position information. For example, the application may be a home screen application, a web browser, an email client, an SMS or other text/chat application, a social networking application, or a third party developer application (e.g., game, productivity tool, utility, etc.). The process 600 may continue by obtaining a permission to track the position of at least a portion of a user's head. For instance, the application may be required to request permission to utilize one or more cameras of the computing device. After the application is authorized to use one or more cameras of the device, a request can be sent to an advertising entity for an advertisement including one or more elements rendered based on head/face position information 602. First image data including at least one first portion of the user's head or face can be captured 604. The first image data is analyzed to determine a first position of the user's head or face relative to the computing device 606. In some embodiments, at least a pair of cameras can be used to capture the first image data. A 3D position of the user's head or face can be determined from the first image data, including depth, distance, and/or disparity relative to the computing device, as discussed elsewhere herein. In other embodiments, a single camera can be used to capture the first image data, which can be combined with information from a proximity or distance sensor to obtain the 3D position of the user's head or face. In still other embodiments, a single camera can be used to capture a single image data and a 2D position of the user's head or face can be calculated for rendering one or more graphical elements incorporated in an advertisement. In still other embodiments, first image data from one or more cameras can be captured and analyzed in combination with sensor data captured by one or more inertial sensors, accelerometers, gyroscopes, digital compasses, etc. to derive user head/face position information. Various approaches known to those of ordinary skill in the art for determining the position of a user's head or face relative to a computing device can be utilized within the scope of the various embodiments.

Once the first position of the user's head or face or a portion thereof is calculated, a first respective rendering of one or more graphical elements can be determined 608. For example, the advertising entity can serve the computing device an advertisement incorporating one or more 3D graphical elements, such as one or more 3D models of one or more virtual objects and rendering logic for transforming or drawing the 3D models based on user head/face position. In some embodiments, the rendering logic can cause additional information to be presented to the user based on the user's head/face position. For example, if the graphical elements correspond to products sold by an advertiser, the additional information could include a product description, pricing information, user ratings, user reviews, and other similar information. In an embodiment, the 3D models may be in the format of MIME type model/x3D+dynper. In another embodiment, the one or more 3D graphical elements may comprise a 3D video. The 3D video can be rendered based on the position of the user's head/face relative to the computing device and may be in the format of MIME type video/mp4+dynper.

The advertisement, including the first respective rendering of the graphical elements rendered based on head position information, can be presented to the user 610. The computing device can continue tracking the head/face or a portion thereof by capturing second image data 612. The second image data can be analyzed to determine a second position of the user's head/face or portion thereof 614. The second position is then compared to the first position 616. If the second position does not exceed the first position by a threshold distance, the user's head/face or portion thereof can be captured 612 and analyzed to determine a new second position of the user's head/face 614 until the new second position exceeds the threshold distance. If the second position exceeds the first position by the threshold distance, a second rendering of the graphical element is calculated 616 and presented to the user via the advertisement 618.

In at least some embodiments, a computing device can also be configured to track and detect head gestures as input to the computing device to enable an advertisement to provide additional interactivity. For example, in an embodiment, an advertisement may include one or more questions directed at a user. The user may respond to the advertisement by nodding his head to indicate a "Yes," and shake his head to answer "No." These head gestures can be recognized by the computing device, and can be sent to the advertiser requesting such information. As another example, instead of recognizing head movements to display different perspectives of graphical elements incorporated in an advertisement, head movements can be used to navigate different screens of the advertisement. For instance, a rightward tilt of the user's head relative to the computing device (and/or rightward tilt of the computing device) can cause a subsequent screen of the advertisement to be displayed. Likewise, a leftward tilt of the users head with respect to the computing device (and/or leftward tilt of the computing device) can cause a previous screen of the advertisement to be presented.

In addition to obtaining permissions to utilize one or more cameras of a computing device, at least some embodiments may also request permissions from the user to collect demographic information about the user based on image data captured by the one or more cameras. For example, image data can be analyzed and gender, eye color, hair color, ethnicity or nationality, and/or age can be determined from the image data. Techniques for classifying gender based on image data are discussed in Mäkinen, Erno et al. "An experimental comparison of gender classification methods." Pattern Recognition Letters 29, no. 10 (2008): 1544-1556, which is incorporated herein by reference. Approaches for determining ethnicity based on image data are discussed in Hosoi, Satoshi et al. "Ethnicity estimation with facial images." Automatic Face and Gesture Recognition, 2004. Proceedings. Sixth IEEE International Conference on, pp. 195-200. IEEE, 2004, which is incorporated herein by reference. Techniques for estimating age from image data are discussed in Fu, Yun et al. "Age synthesis and estimation via faces: A survey." Pattern Analysis and Machine Intelligence, IEEE Transactions on 32, no. 11 (2010): 1955-1976, which is incorporated herein by reference. In at least some embodiments, image data can also be analyzed to determine the user's emotional reaction to an advertisement. Approaches for determining facial expressions or emotional reactions from image data are discussed in Fasel, Beat, and Juergen Luettin. "Automatic facial expression analysis: a survey." Pattern recognition 36, no. 1 (2003): 259-275, which is incorporated by reference herein. Such demographic or emotional reaction information can be used to improve product marketing or to improve the types of advertisements that are presented to the user. Further, after the demographic information is collected, the demographic information can be anonymized to protect the privacy of users.

Figure 7:
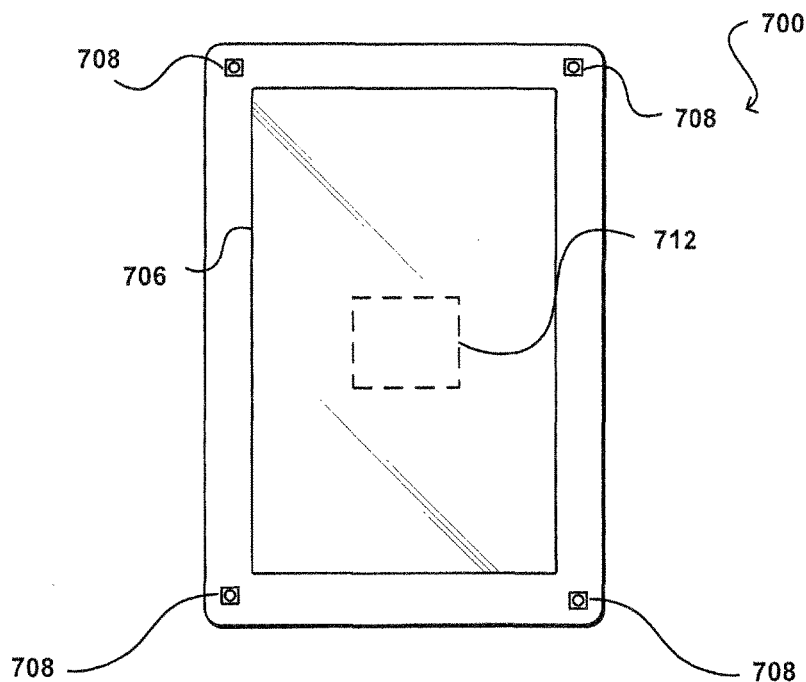
FIG. 7 illustrates an example computing device that can be used in accordance with various embodiments.

FIG. 7 illustrates an example computing device 700 that can be used to perform approaches described in accordance with various embodiments. In this example, the device includes four cameras 708 located at the top and bottom on each of a same and opposite side of the device as a display element 706, and enabling the device to capture images in accordance with various embodiments. The computing device also includes an inertial measurement unit (IMU) 712, comprising a three-axis gyroscope, three-axis accelerometer, and magnetometer that can be used to detect the motion and/or orientation of the device, and to facilitate head tracking in accordance with various embodiments.

Figure 8:
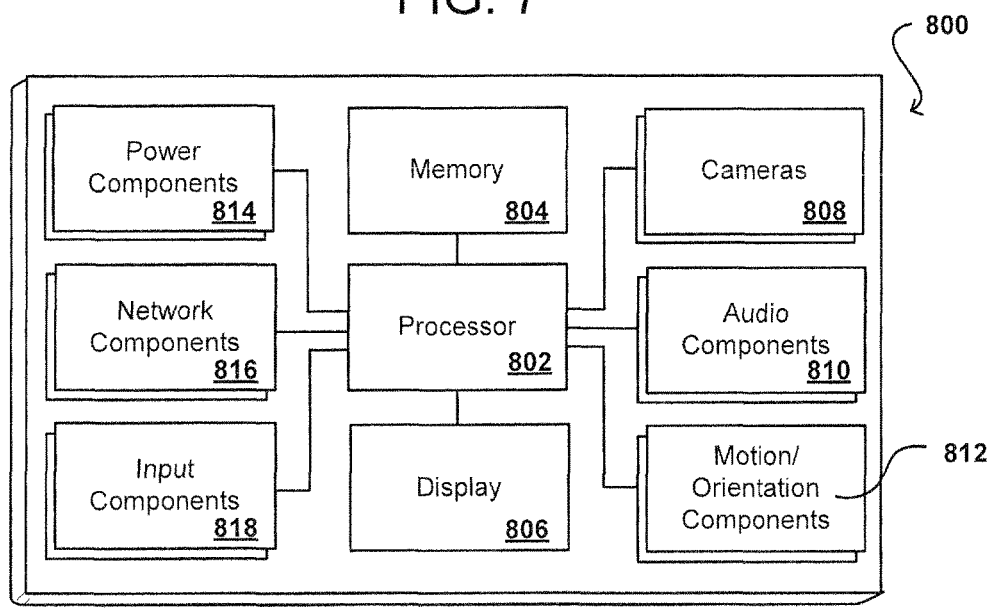
FIG. 8 illustrates an example configuration of components of a computing device such as that illustrated in FIG. 7.

FIG. 8 illustrates a logical arrangement of a set of general components of an example computing device 800. In this example, the device includes a processor 802 for executing instructions that can be stored in a memory component 804. As would be apparent to one of ordinary skill in the art, the memory component can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. The device in many embodiments will include one or more cameras or image sensors 808 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc.

Further, a device can include the ability to start and/or stop image capture, such as when receiving a command from a user, application, or other device. The example device can include at least one audio component 810, such as a mono or stereo microphone or microphone array, operable to capture audio information from at least one primary direction. A microphone can be a uni- or omni-directional microphone as known for such devices. In some embodiments, a computing device can alternatively or additionally include other input elements to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 812. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

The computing device also includes various power components 814 known in the art for providing power to a computing device, which can include capacitive charging elements for use with a power pad or similar device. The computing device can include one or more communication elements or networking sub-systems 816, such as a Wi-Fi, Bluetooth, RF, wired, or wireless communication system. The device in many embodiments can communicate with a network, such as the Internet, and may be able to communicate with other such devices. In some embodiments the device can include at least one additional input element 818 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

Figure 9:
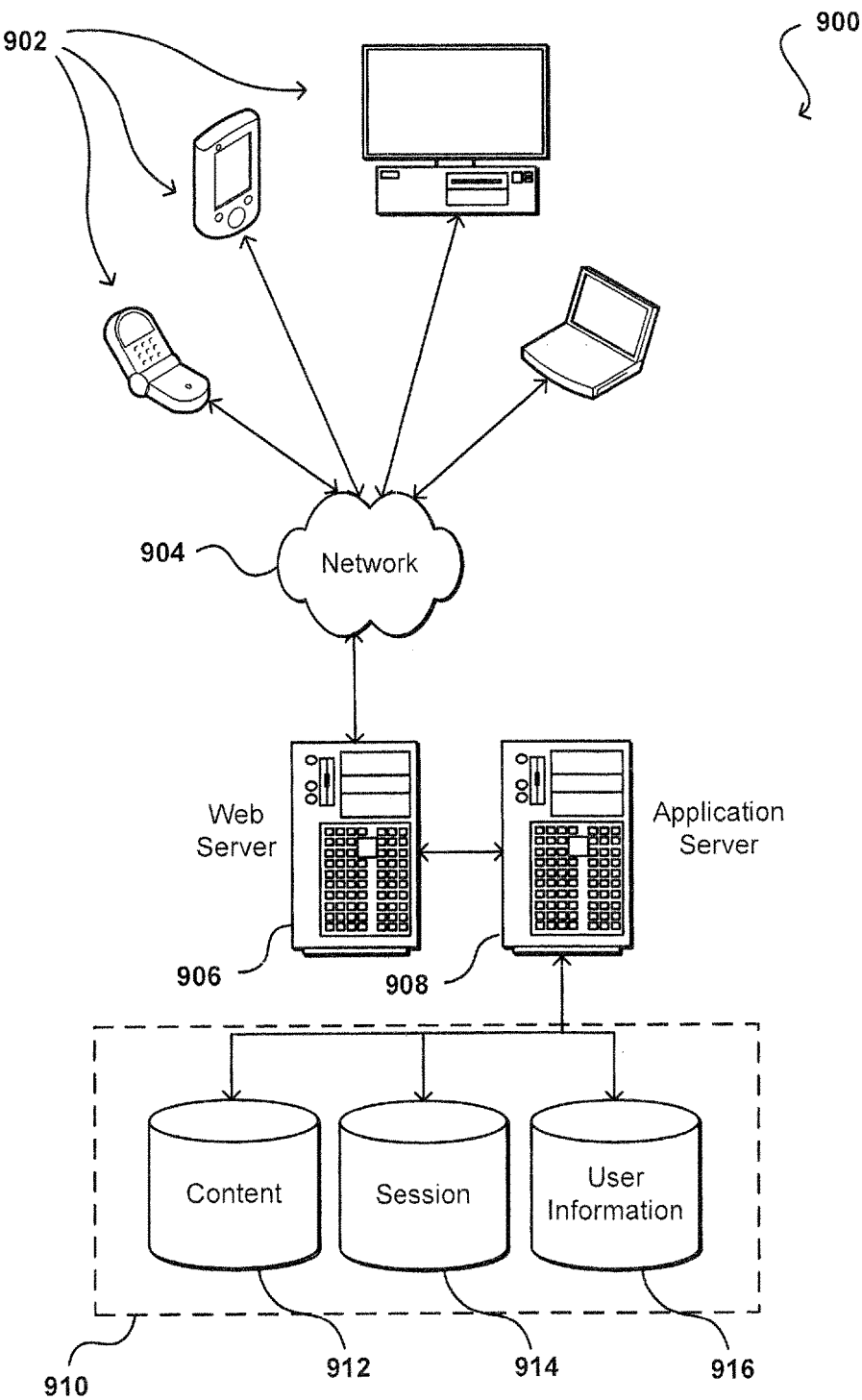
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A portable computing device, comprising:
    a processor;
    at least a pair of cameras;
    a display screen; and
    memory including instructions that, upon being executed by the processor, cause the portable computing device to:
    transmit a request for media content;
    capture, using at least the pair of cameras, first image data including a first representation of at least one first portion of a face of a user;
    determine a first three-dimensional (3D) position of the face of the user relative to the portable computing device using the first image data;
    determine at least one first 3D rendering of a product using the first 3D position of the face of the user relative to the portable computing device, the at least one first 3D rendering of the product to be included with the media content;
    display, on the display screen, the media content including the at least one first 3D rendering of the product;
    capture, using at least the pair of cameras, second image data including a second representation of at least one second portion of the face of the user;
    determine a second 3D position of the face of the user relative to the portable computing device using the second image data;
    determine that a change between the first 3D position and the second 3D position exceeds a threshold amount;
    determine at least one second 3D rendering of the product using the second 3D position; and
    display, on the display screen, the media content including the at least one second 3D rendering of the product.

2. The portable computing device of claim 1, wherein the instructions upon being executed further cause the portable computing device to:
    obtain a permission to utilize at least the pair of cameras;
    send a request to an advertising entity for at least one advertisement including at least one 3D graphical element that is rendered based on a 3D position of at least the one portion of the face of the user, the request including information indicating that the portable computing device is capable of tracking at least the one portion of the face of the user; and
    obtain at least the one advertisement including a 3D model of the product and rendering logic based on face position information of the user.

3. The portable computing device of claim 2, the instructions upon being executed further cause the portable computing device to:
    display information regarding the product upon displaying the media content including the second 3D rendering of the product, the information including at least one of a product description, pricing, user ratings, or user reviews.

4. A computer-implemented method, comprising:
    transmit a request for media content;
    capture at least one first image including a first representation of at least one first portion of a face of a user;
    determine a first three-dimensional (3D) position of the face of the user relative to a computing device using at least the first image;
    display the media content including at least one first 3D rendering of a graphical element representing a product, the at least one first 3D rendering being based at least in part upon the first 3D position of the face of the user relative to the computing device, the at least one first 3D rendering to be included with the media content, the media content and the graphical element corresponding to the product;
    capture at least one second image including a second representation of at least one second portion of the face of the user;

determine a second 3D position of the face of the user relative to the computing device using at least the second image; and display the media content including at least one second 3D rendering of the graphical element, the at least one second 3D rendering being based at least in part upon the second 3D position of the face of the user relative to the computing device.

5. The computer-implemented method of claim 4, further comprising:

displaying information regarding the product upon displaying the media content including the at least one second rendering of the graphical element.

6. The computer-implemented method of claim 4, wherein the graphical element is a 3D video.

7. The computer-implemented method of claim 4, further comprising:

obtaining a permission to utilize at least one camera of the computing device;

sending a request to an advertising entity for at least one advertisement including at least one graphical element that is rendered based on a position of at least the one portion of the face of the user; and obtaining at least the one advertisement including the at least one graphical element and rendering logic based on face position information of the user.

8. The computer-implemented method of claim 7, wherein the advertising entity is at least one of an ad network, an ad mediator, or an ad exchange.

9. The computer-implemented method of claim 7, wherein the at least one graphical element and the rendering logic are formatted as a Multi-Purpose Internet Mail Extensions (MIME) type.

10. The computer-implemented method of claim 4, further comprising:

determining a head gesture as input to the computing device.

11. The computer-implemented method of claim 4, further comprising:

determining an emotional reaction of the user to the media content from one of the first image or the second image.

12. The computer-implemented method of claim 4, wherein the media content is a banner advertisement.

13. The computer-implemented method of claim 4, wherein the media content is a full-screen advertisement.

14. The computer-implemented method of claim 4, further comprising:

obtaining a permission to collect a demographic trait of the user based on at least one of the first image or the second image; and determining the demographic trait of the user from one of the first image or the second image.

15. The computer-implemented method of claim 14, wherein the demographic trait is one of a gender, an ethnicity, or an age of the user.

16. A system, comprising:

a processor;

memory including instructions that, upon being executed by the processor, cause the system to:

obtain a request for media content from a computing device;

determine that the computing device is capable of three-dimensional (3D) rendering at least one view of an object based on a 3D position of at least one portion of a face of a user of the computing device, the 3D rendering of the at least one view of the object to be included with the media content, the object corresponding to and representing at least one product; and provide, to the computing device, the media content including the at least one view of the object and 3D rendering logic based on the 3D position of the at least one portion of the face of the user relative to the computing device.

17. The system of claim 16, wherein the instructions upon being executed to cause the system to determine that the computing device is capable of the 3D rendering the object includes causing the computing device to:

obtain user agent information from the computing device; and determine one or more capabilities of the computing device based on the user agent information.

18. The system of claim 16, wherein the at least one view of the object and the 3D rendering logic are formatted as a MIME type.

19. The system of claim 16, wherein the media content is one of a banner advertisement or a full-screen advertisement.

20. The system of claim 16, wherein the instructions upon being executed further cause the computing device to:

obtain at least one of a demographic trait of the user or an emotional reaction of the user to the media content.

* * * * *